United States Patent [19]
Chen

[11] Patent Number: 5,832,098
[45] Date of Patent: Nov. 3, 1998

[54] EARPHONE/MICROPHONE ASSEMBLY

[75] Inventor: Tonny Chen, Chang Hua, Taiwan

[73] Assignee: E. Lead Electronic Co., Ltd., Chang Hua, Taiwan

[21] Appl. No.: 924,769

[22] Filed: Aug. 27, 1997

[51] Int. Cl.⁶ .................................................. H04R 25/00
[52] U.S. Cl. ......................... 381/370; 381/384; 381/375
[58] Field of Search .................................... 381/370, 384; 455/575, 90, 569, 351; 439/501, 12, 13, 18, 20, 22, 24, 27; 379/438, 430

[56] References Cited

U.S. PATENT DOCUMENTS

| | | | |
|---|---|---|---|
| 4,384,688 | 5/1983 | Smith | 242/107.7 |
| 5,339,461 | 8/1994 | Luplow | 455/351 |
| 5,422,957 | 6/1995 | Cummins | 381/183 |
| 5,511,120 | 4/1996 | Hirata et al. | 379/433 |
| 5,581,821 | 12/1996 | Nakano | 2/422 |
| 5,684,883 | 11/1997 | Chen | 381/370 |
| 5,724,667 | 3/1998 | Furuno | 455/575 |

*Primary Examiner*—Sinh Tran
*Attorney, Agent, or Firm*—Peterson, Wicks, Nemer & Kamrath, P.A.; Alan D. Kamrath, Esq.

[57] ABSTRACT

An earphone/microphone assembly has a main body, an earphone/microphone union device, and a connection wire connected to the main body and the earphone/microphone union device. The main body has a base seat, a wire receiving disk disposed in the base seat, a plurality of annular bosses formed on the wire receiving disk, a reel disk disposed in the base seat to cover the wire receiving disk, a plurality of reeds disposed on a bottom of the reel disk, a center recess hole formed on the reel disk, a magnet disposed in the reel disk, an annular groove formed on the reel disk, and a hollow casing covering the base seat. The hollow casing has a through hole. A plug is disposed on the hollow casing. A lead wire surrounds the annular bosses. An end of the connection wire is connected to one of the reeds. The connection wire winds the annular groove.

10 Claims, 14 Drawing Sheets

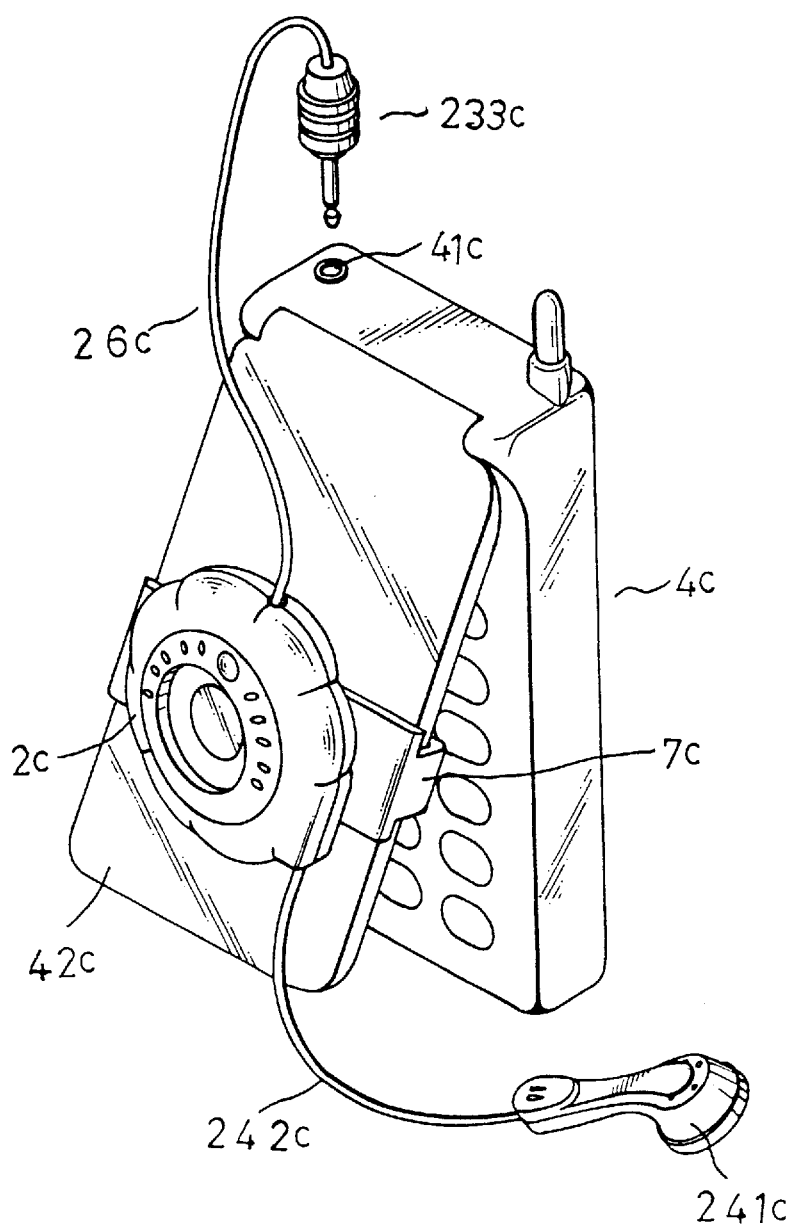
F I G. 10

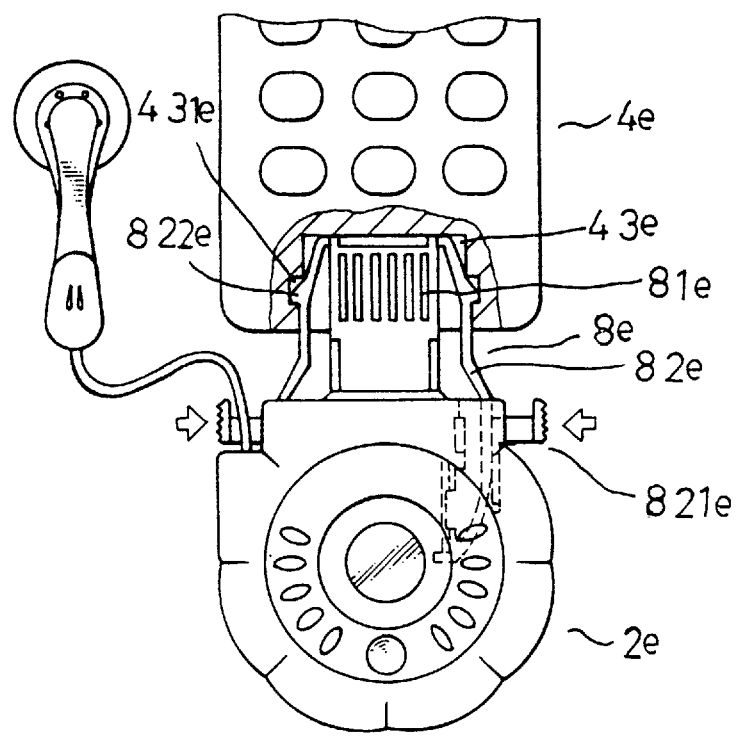
F I G. 12

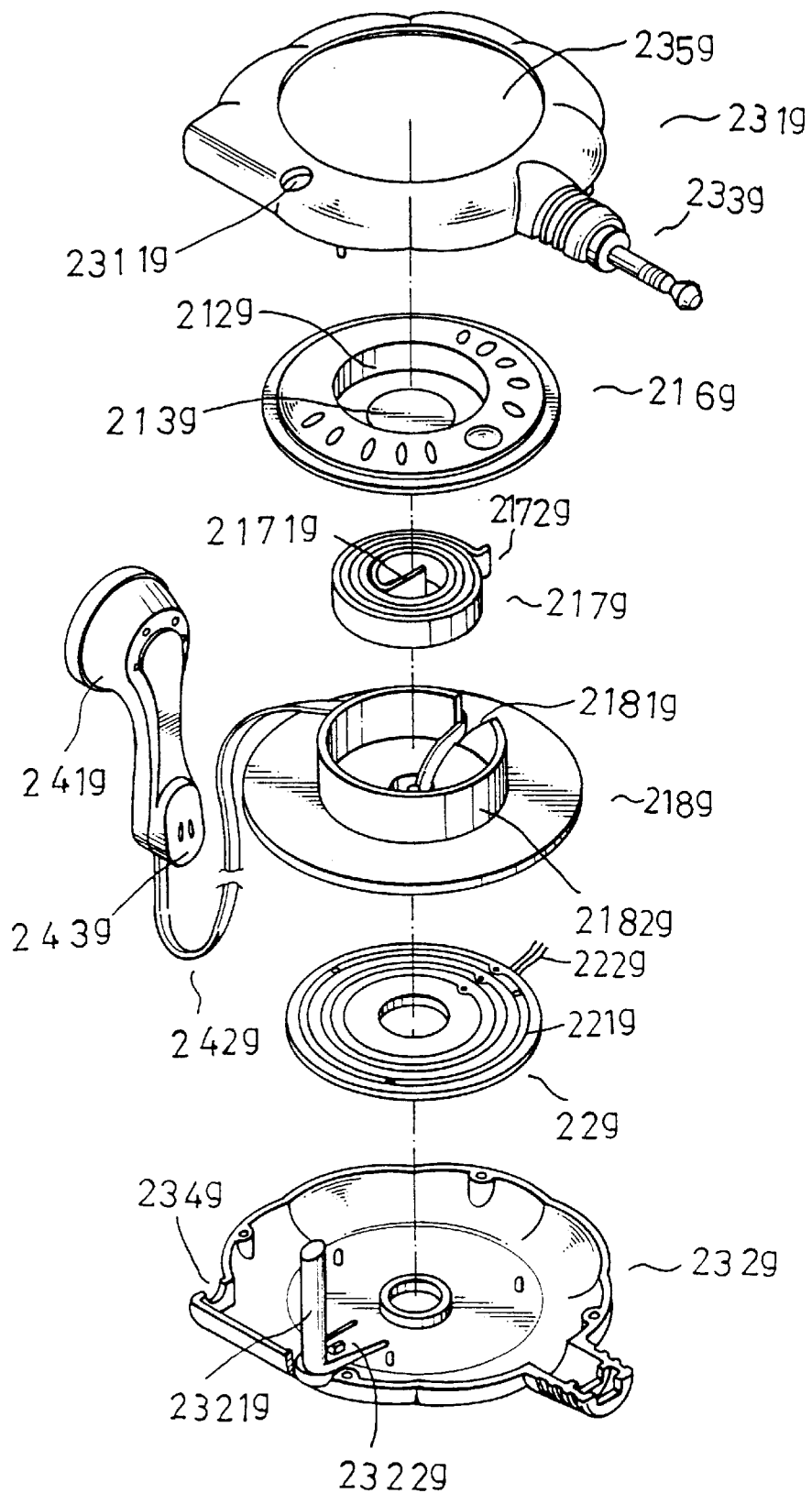
F I G. 15

EARPHONE/MICROPHONE ASSEMBLY

BACKGROUND OF THE INVENTION

The present invention relates to an earphone/microphone assembly. More particularly, the present invention relates to an earphone/microphone assembly which can receive a wire of an earphone/microphone so that the wire will not be tangled.

A conventional earphone/microphone device comprises a long wire. However, the long wire is easily tangled.

SUMMARY OF THE INVENTION

An object of the present invention is to provide an earphone/microphone assembly which can receive a wire of an earphone/microphone so that the wire will not be tangled.

In accordance with an embodiment of the present invention, an earphone/microphone assembly comprises a main body, an earphone/microphone union device, and a connection wire connected to the main body and the earphone/microphone union device. The main body has a base seat, the base seat having a lead hole, a wire receiving disk disposed in the base seat, a plurality of annular bosses formed on the wire receiving disk, a reel disk disposed in the base seat to cover the wire receiving disk, a plurality of reeds disposed on a bottom of the reel disk, a center recess hole formed on the reel disk, a magnet disposed in the reel disk, an annular groove formed on the reel disk, and a hollow casing covering the base seat. The hollow casing has a through hole. A plug is disposed on the hollow casing. A lead wire surrounds the annular bosses. An end of the connection wire is connected to one of the reeds. The connection wire winds the annular groove. The earphone/microphone union device has an earphone and a microphone.

In accordance with another embodiment of the present invention, an earphone/microphone assembly comprises a main body, an earphone/microphone union device, and a connection wire connected to the main body and the earphone/microphone union device. The main body has a base seat, a wire receiving disk disposed in the base seat, a plurality of annular bosses formed on the wire receiving disk, a reel disk disposed in the base seat to cover the wire receiving disk, and a hollow casing covering the base seat. The base seat has a lead hole, a press rod and a plurality of protrusions. The reel disk has a lower disk and an upper disk disposed on the lower disk. The lower disk has a plurality of protruded blocks disposed on a bottom of the lower disk, a plurality of reeds disposed on the bottom of the lower disk, a ring disposed on the lower disk, and a notch formed on the ring. The upper disk has a center recess hole formed on the upper disk, a magnet disposed in the upper disk, a round plate disposed on a bottom of the upper disk, two posts disposed on a bottom of the round plate, and a spacing defined between two posts. A spiral spring is disposed in the ring, The spiral spring has a first end and a second end. The hollow casing has a through hole and a round hole. A plug is disposed on the hollow casing. A lead wire surrounds the annular bosses. An end of the connection wire is connected to one of the reeds. The connection wire winds the annular groove. The press rod passes through the round hole. The first end of the spiral spring is inserted in the spacing. The earphone/microphone union device has an earphone and a microphone.

BRIEF DESCRIPTION OF THE DRAWINGS

FIG. 10 is a schematic view illustrating an application of an earphone/microphone assembly of a fourth preferred embodiment in accordance with the present invention;

FIG. 12 is a schematic view illustrating an application of an earphone/microphone assembly of a sixth preferred embodiment in accordance with the present invention;

FIG. 15 is a perspective exploded view of an earphone/microphone assembly of an eighth preferred embodiment in accordance with the present invention;

DETAILED DESCRIPTION OF THE INVENTION

Figure 1:
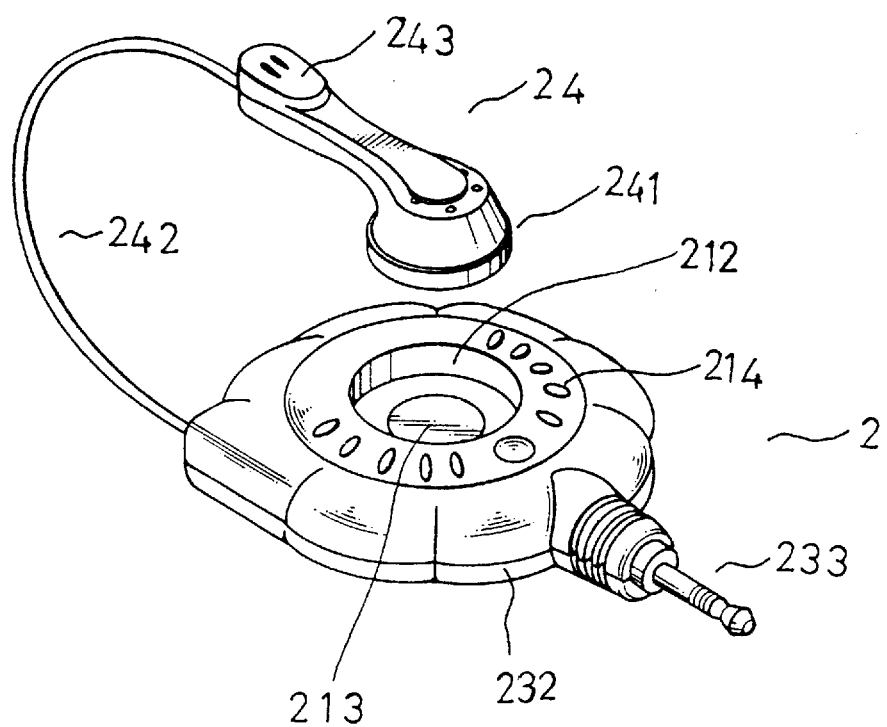
FIG. 1 is a perspective assembly view of an earphone/microphone assembly of a first preferred embodiment in accordance with the present invention.
Figure 2:
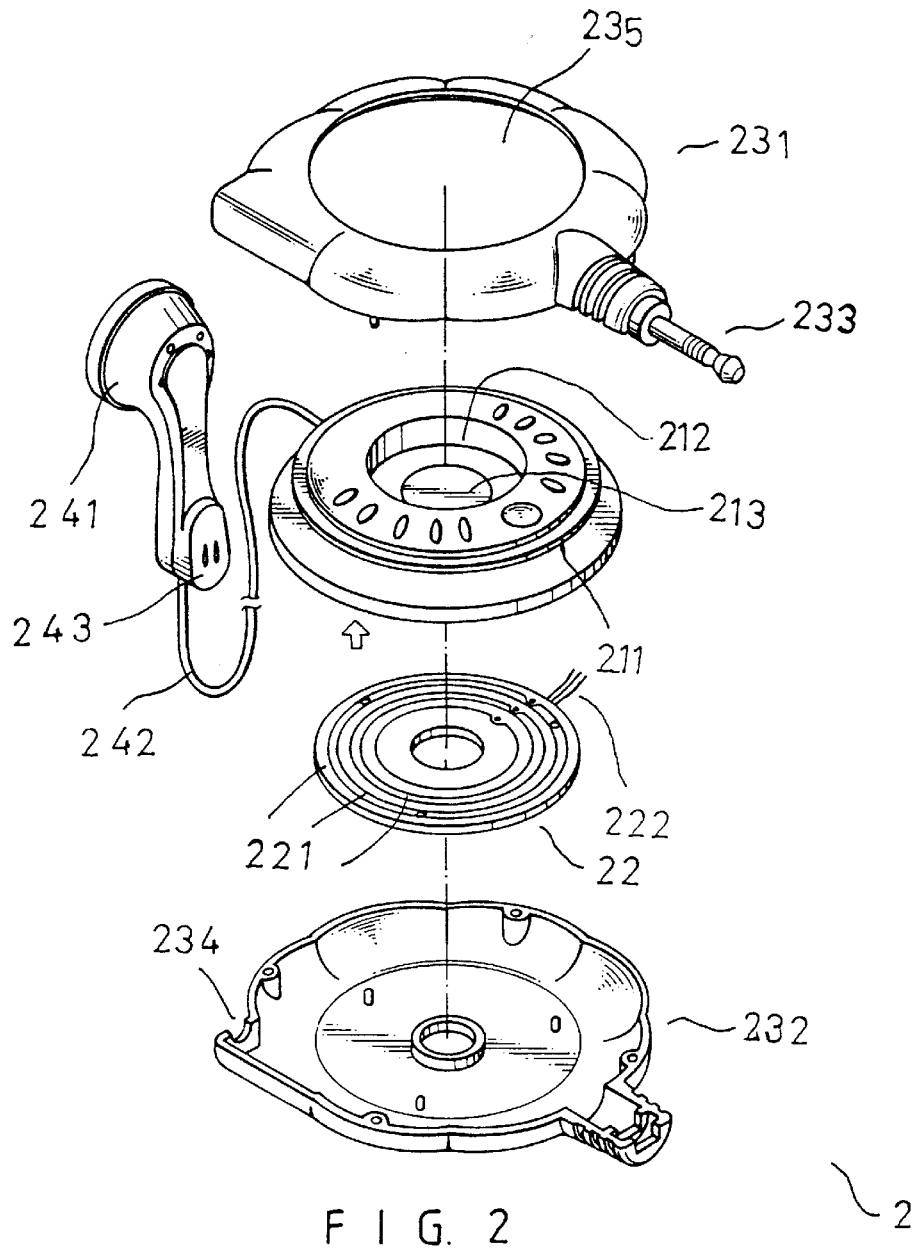
FIG. 2 is a perspective exploded view of an earphone/microphone assembly of a first preferred embodiment in accordance with the present invention.
Figure 2A:
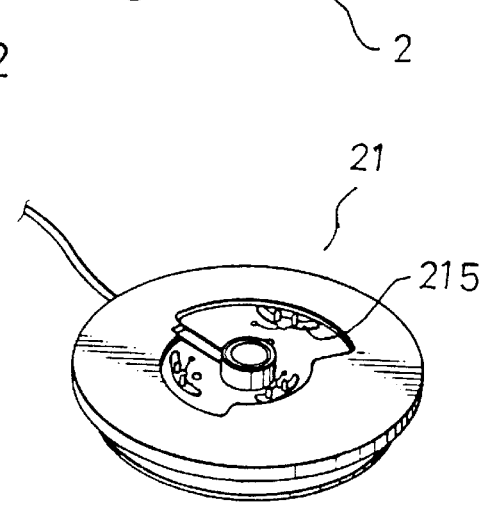
FIG. 2A is a perspective view of a reel disk.
Figure 3:
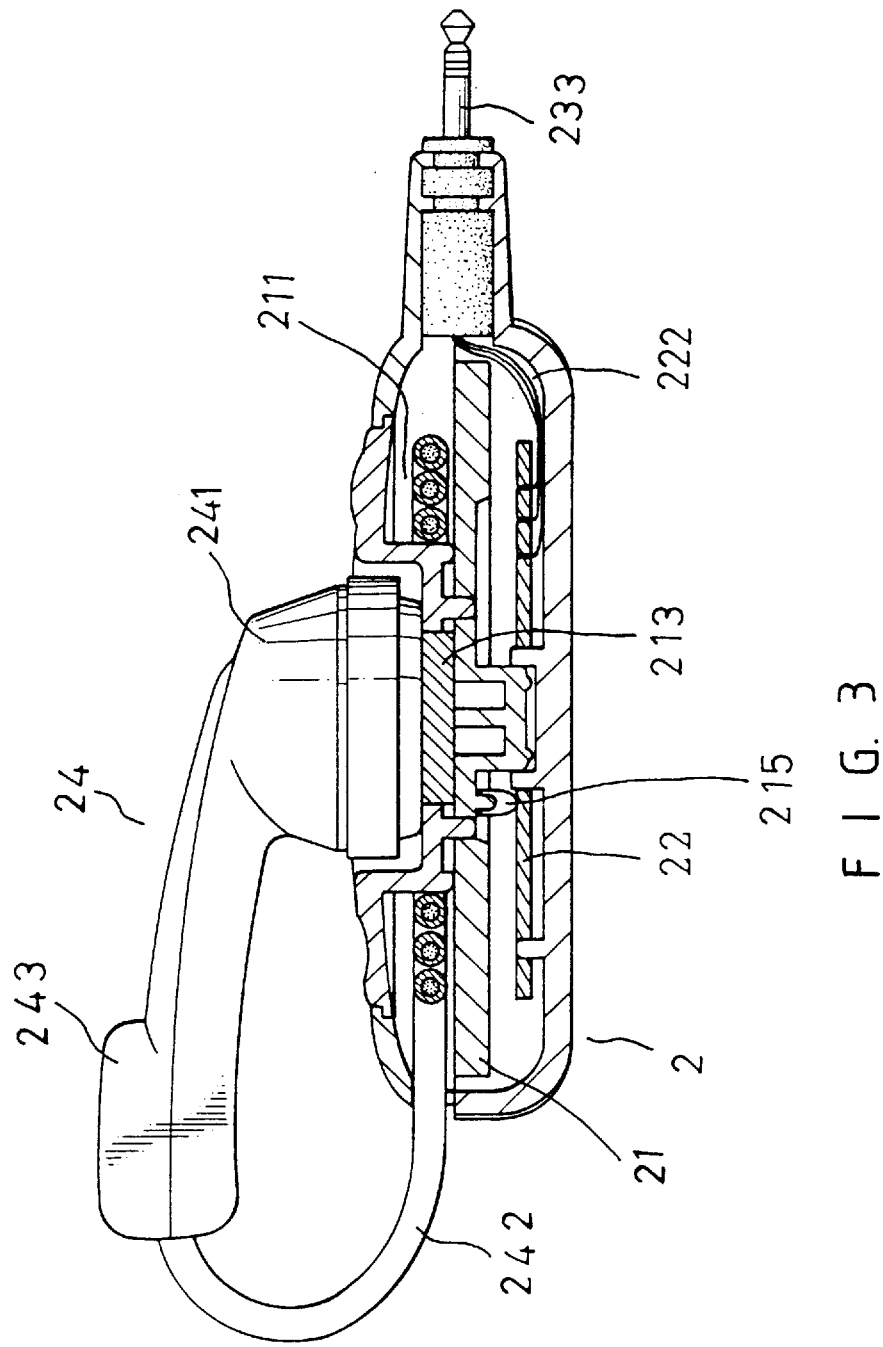
FIG. 3 is a partially sectional view of FIG. 1.
Figure 4:
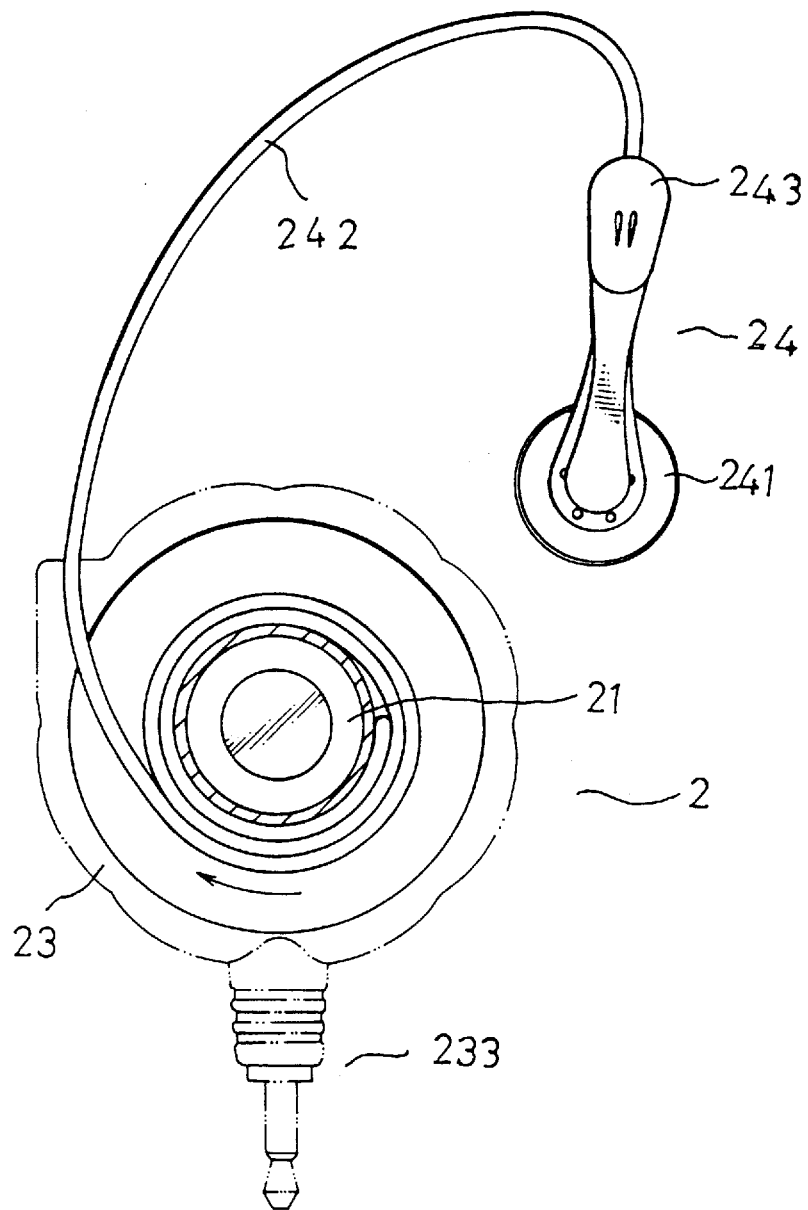
FIG. 4 is a schematic view illustrating an operation of an earphone/microphone assembly of a first preferred embodiment in accordance with the present invention.

Referring to FIGS. 1 to 4, a first earphone/microphone assembly comprises a main body 2, an earphone/microphone union device 24, and a connection wire 242 connected to the main body 2 and the earphone/microphone union device 24. The main body 2 has a base seat 232, the base seat 232 having a lead hole 234, a wire receiving disk 22 disposed in the base seat 232, a plurality of annular bosses 221 formed on the wire receiving disk 22, a reel disk 21 disposed in the base seat 232 to cover the wire receiving disk 22, a plurality of reeds 215 disposed on a bottom of the reel disk 21, a center recess hole 212 formed on the reel disk 21, a magnet 213 disposed in the reel disk 21, an annular groove 211 formed on the reel disk 21, and a hollow casing 231 covering the base seat 232. The hollow casing 231 has a through hole 235. A plug 233 is disposed on the hollow casing 231. A lead wire 222 surrounds the annular bosses 221. An end of the connection wire 242 is connected to one of the reeds 215. The connection wire 242 winds the annular groove 211. The earphone/microphone union device 24 has an earphone 241 and a microphone 243.

Figure 5:
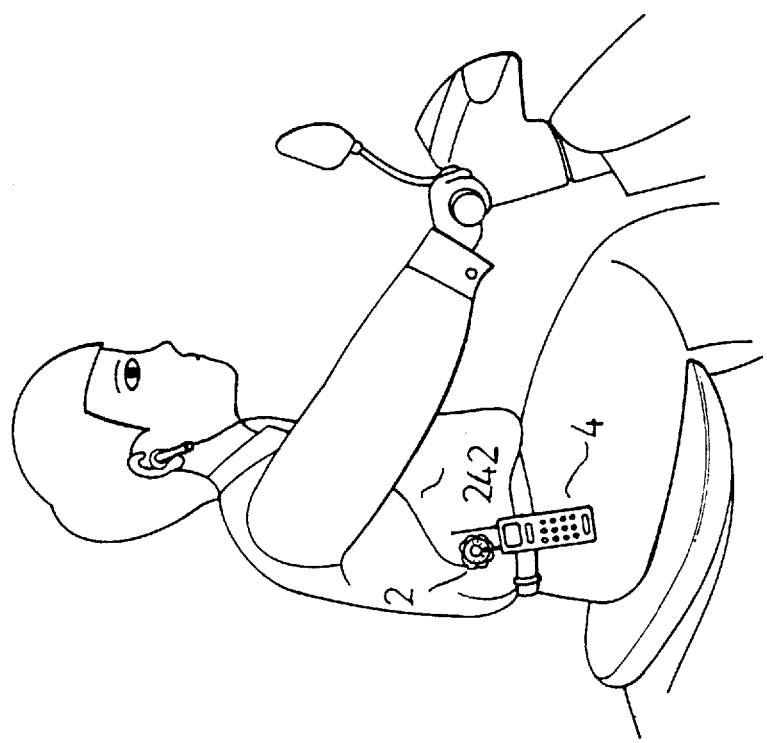
FIG. 5 is a schematic view illustrating an application of an earphone/microphone assembly of a first preferred embodiment in accordance with the present invention.
Figure 6:
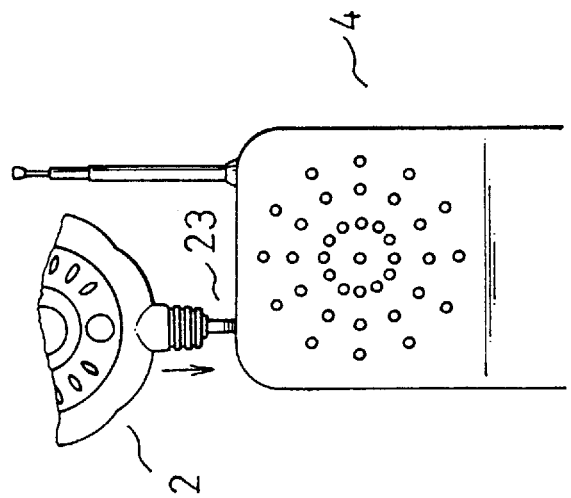
FIG. 6 is a partially enlarged view of FIG. 5.

Referring to FIGS. 5 and 6, the plug 233 is inserted in a mobile phone 4.

Figure 7:
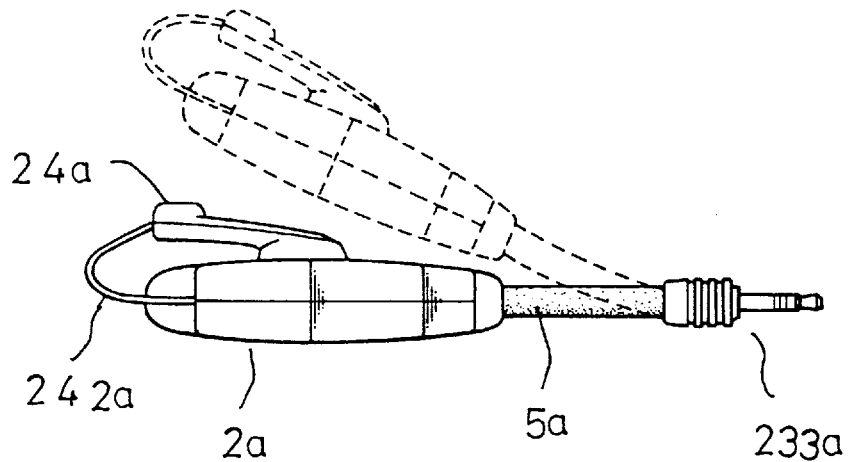
FIG. 7 is a perspective assembly view of an earphone/microphone assembly of a second preferred embodiment in accordance with the present invention.

Referring to FIG. 7, a second earphone/microphone assembly comprises a main body 2a, an earphone/microphone union device 24a, a connection wire 242a connected to the main body 2a and the earphone/microphone union device 24a, and a flexible pipe 5a connected to the main body 2a and a plug 233a. Therefore, the angle between the flexible pipe 5a and the plug 233a can be adjusted.

Figure 8A:
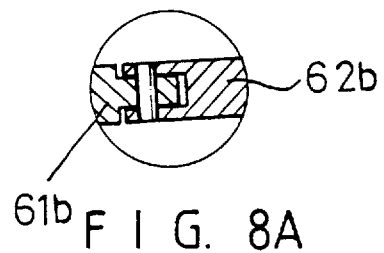
FIG. 8A is a partially sectional view of FIG. 8.
Figure 8:
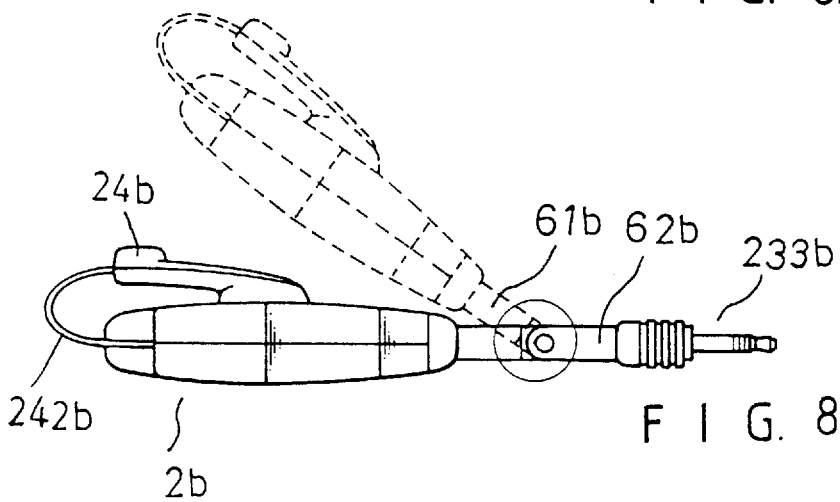
FIG. 8 is a perspective assembly view of an earphone/microphone assembly of a third preferred embodiment in accordance with the present invention.

Referring to FIGS. 8 and 8A, a third earphone/microphone assembly comprises a main body 2b, an earphone/microphone union device 24b, a connection wire 242b connected to the main body 2b and the earphone/microphone union device 24b, a first flexible pipe 61b connected to the main body 2b and a second flexible pipe 62b, and the second flexible pipe 5b connected to the main body 2b and a plug 233b. Since the first flexible pipe 61b and the second flexible pipe 62b are connected pivotally, the angle between the first flexible pipe 61b and the second flexible pipe 62b can be adjusted.

Figure 9:
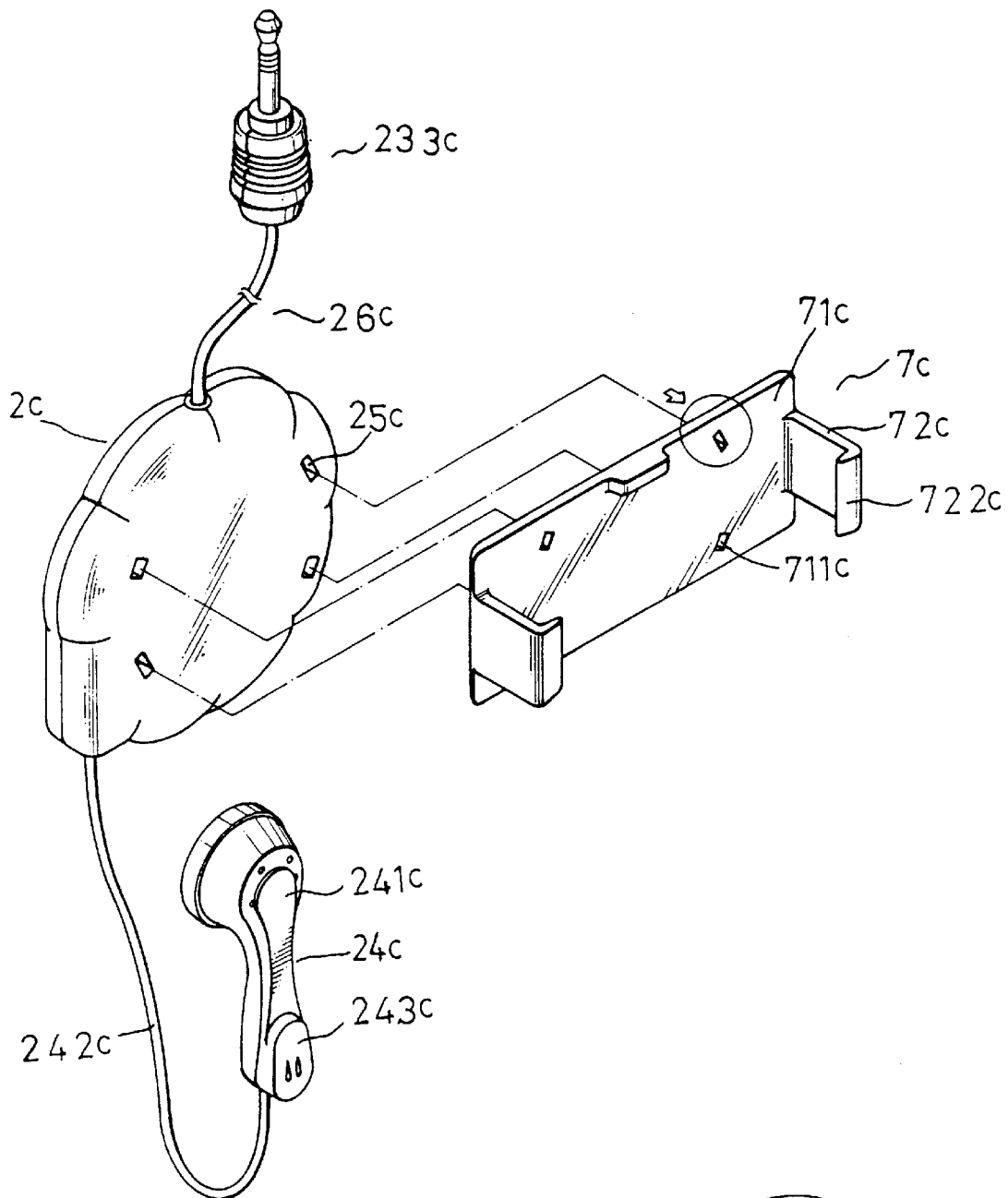
FIG. 9 is a perspective exploded view of an earphone/microphone assembly of a fourth preferred embodiment in accordance with the present invention.
Figure 9A:
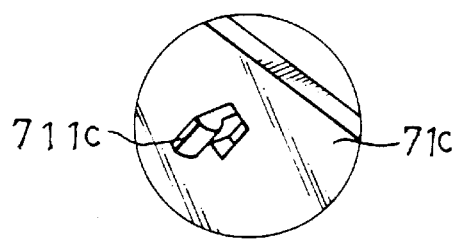
FIG. 9A is a partially enlarged view of a clamp plate in FIG. 9.

Referring to FIGS. 9 and 9A, a fourth earphone/microphone assembly comprises a main body 2c, an earphone/microphone union device 24c, a first connection wire 242c connected to the main body 2c and the earphone/microphone union device 24c, a second connection wire 26c connected to the main body 2c and a plug 233c, a plurality of insertion holes 25c formed on a bottom of the main body 2c, and a base plate 7c disposed on the bottom of the main body 2c. The base plate 7c has a flat plate 71c, two arm plates 72c disposed on the flat plate 71c, and a plurality of clamp hooks 711c disposed on the flat plate 71c. The clamp hooks 711c are inserted in the corresponding insertion holes 25c respectively. Each arm plate 72c has a clamp flange end 722c. Referring to FIG. 10, a mobile phone 4c has a jack 41c receiving the plug 233c, and a movable plate 42c. Each clamp flange end 722c clamps the movable plate 42c. The earphone/microphone union device 24c has an earphone 241c and a microphone 243c.

Figures 11, 11A:
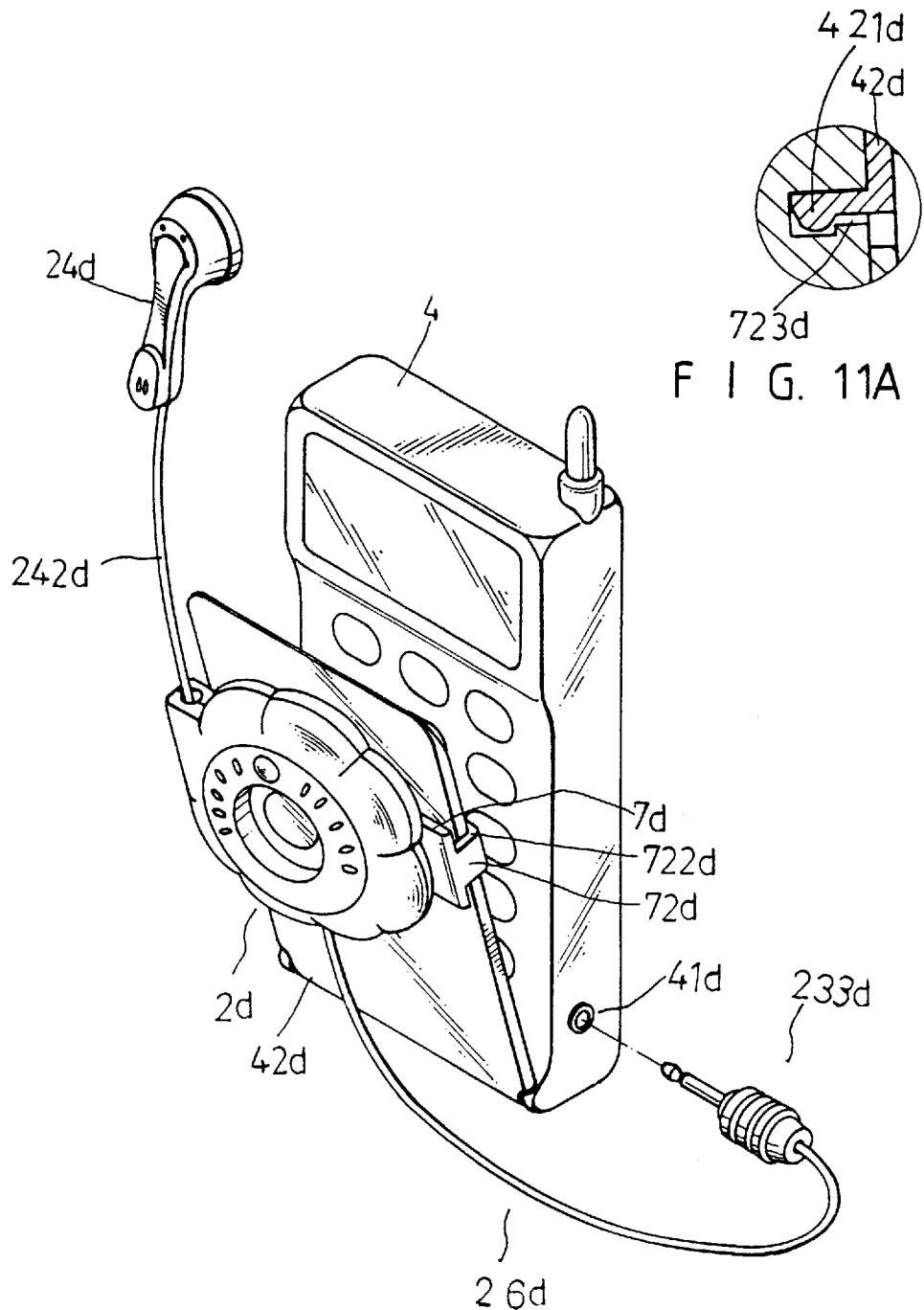
FIG. 11 is a schematic view illustrating an application of an earphone/microphone assembly of a fifth preferred embodiment in accordance with the present invention.
FIG. 11A is a partially sectional view of FIG. 11.

Referring to FIGS. 11 and 11A, a fifth earphone/microphone assembly comprises a main body 2d, an earphone/microphone union device 24d, a first connection wire 242d connected to the main body 2d and the earphone/microphone union device 24d, a second connection wire 26d connected to the main body 2d and a plug 233d, and a base plate 7d disposed on the bottom of the main body 2d. The base plate 7d has two arm plates 72d. Each arm plate 72d has a clamp flange end 722d and a recess hole 723d. A mobile phone 4d has a jack 41d receiving the plug 233d, and a movable plate 42d. The movable plate 42d has two lateral protrusions 421d disposed on two laterals of the movable plate 42d to be inserted in the corresponding recess holes 723d respectively. Each clamp flange end 722d clamps the movable plate 42d.

Referring to FIG. 12, a sixth earphone/microphone assembly comprises a main body 2e and a plug 8e disposed on the main body 2e. A mobile phone 4e has a blind hole 43e receiving the plug 8e. Two clip holes 431e are formed in the mobile phone 4e to communicate with the blind hole 43e. The plug 8e has a plurality of conductors 81e and two elastic clamps 82e. Each elastic clamp 82e has a clip protrusion 822e inserted in each respective clip hole 431e. Two press plates 821e are connected to the corresponding elastic clamps 82e respectively.

Figure 14:
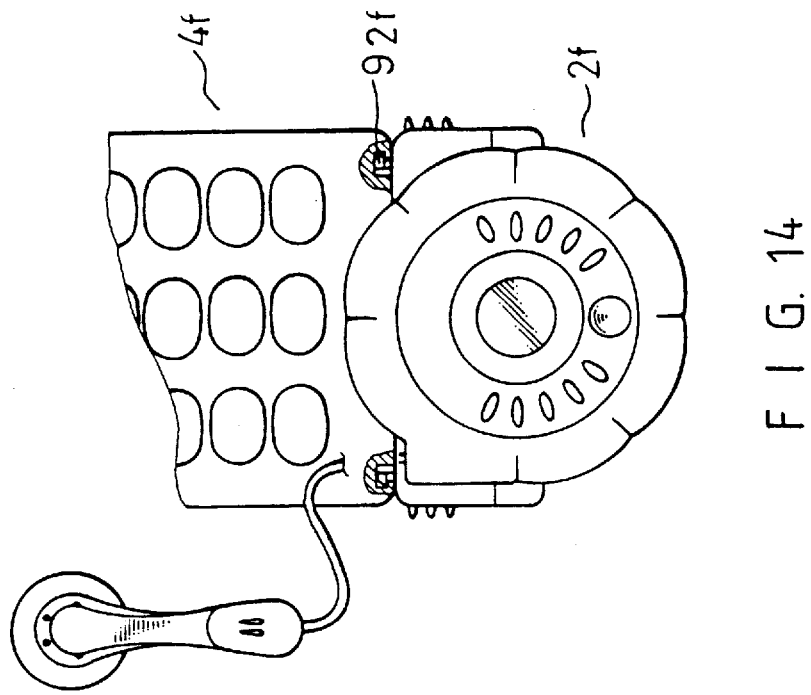
FIG. 14 is a perspective assembly view of an earphone/microphone assembly of a seventh preferred embodiment in accordance with the present invention.
Figure 13:
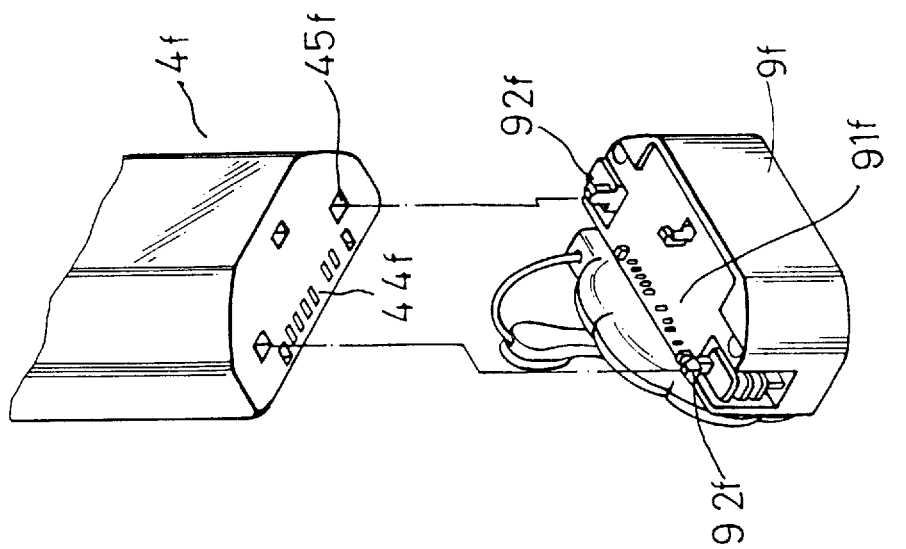
FIG. 13 is a perspective exploded view of an earphone/microphone assembly of a seventh preferred embodiment in accordance with the present invention.
Figure 15B:
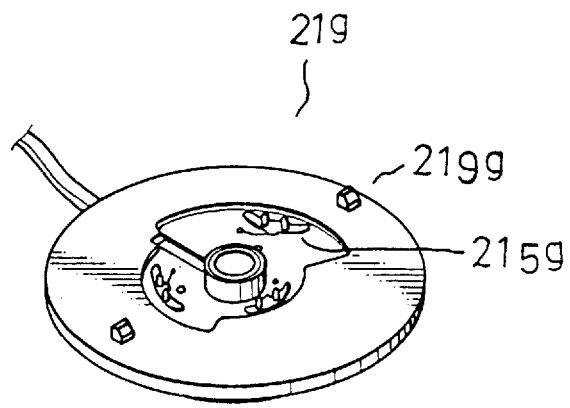
FIG. 15B is a perspective view of a lower disk.
Figure 15A:
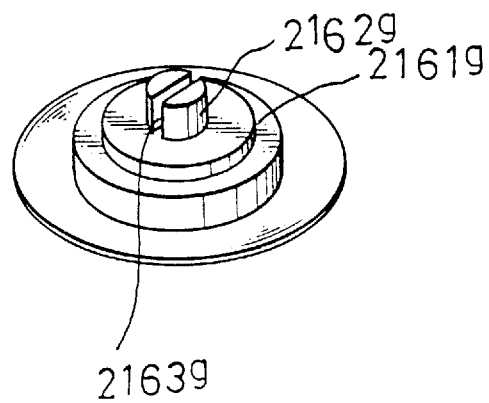
FIG. 15A is a perspective view of an upper disk.
Figure 16:
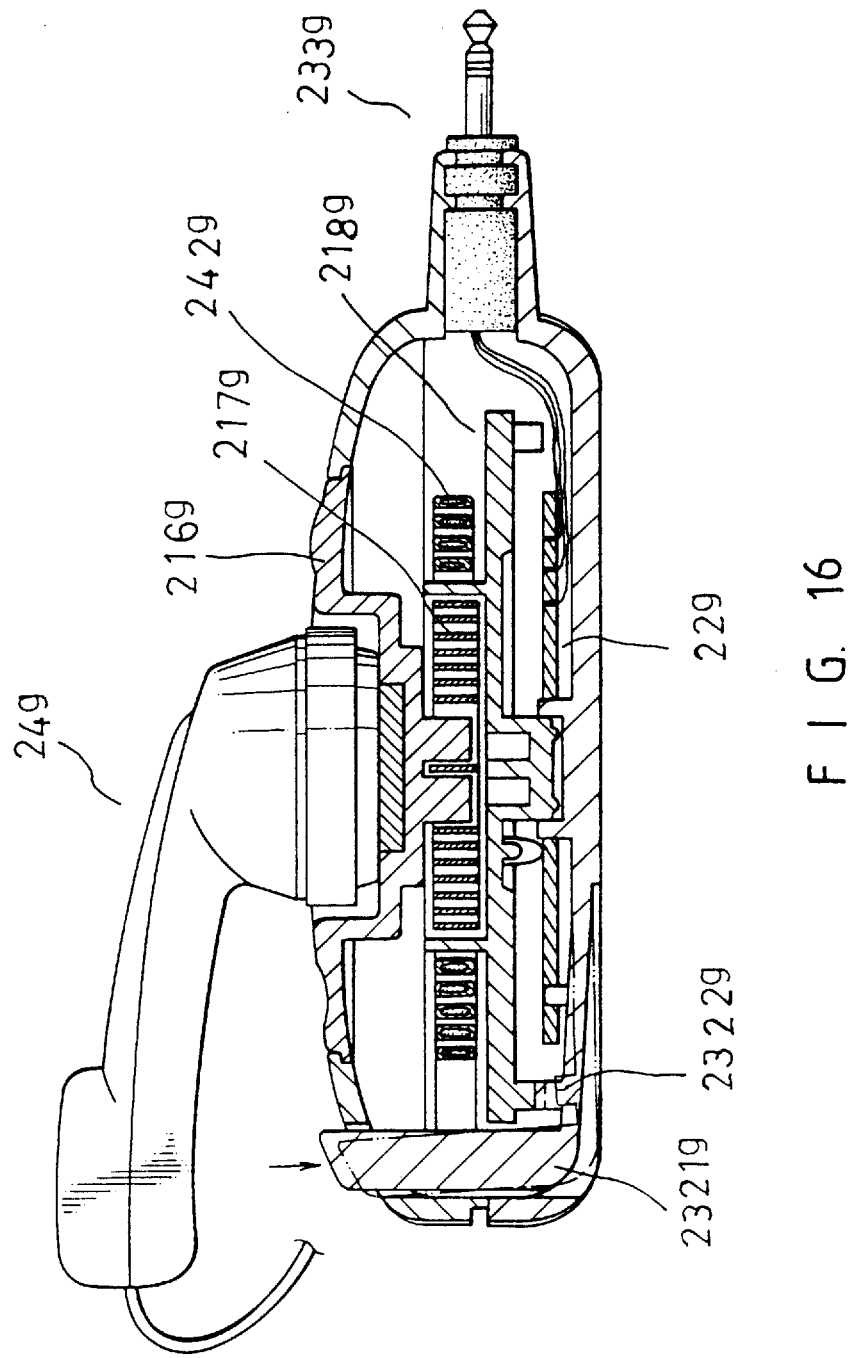
FIG. 16 is a sectional assembly view of an earphone/microphone assembly of an eighth preferred embodiment in accordance with the present invention.

Referring to FIGS. 13 and 14, a seventh earphone/microphone assembly comprises a main body 2f and a plug seat 9f disposed on the main body 2f. A mobile phone 4f has two blind holes 45f and a plurality of electrode plates 44f. The plug seat 9f has two elastic hooks 92f inserted in the corresponding blind holes 45f respectively and a plurality of probes 91f contacting the electrode plates 44f.

Referring to FIGS. 15, 15A, 15B and 16, an eighth earphone/microphone assembly comprises a main body 2g, an earphone/microphone union device 24g, and a connection wire 242g connected to the main body 2g and the earphone/microphone union device 24g. The main body 2g has a base seat 232g, a wire receiving disk 22g disposed in the base seat 232g, a plurality of annular bosses 221g formed on the wire receiving disk 22g, a reel disk 21g disposed in the base seat 232g to cover the wire receiving disk 22g, and a hollow casing 231g covering the base seat 232g. The base seat 232g has a lead hole 234g, a press rod 2321g and a plurality of protrusions 2322g. The reel disk 21g has a lower disk 218g and an upper disk 216g disposed on the lower disk 218g. The lower disk 218g has a plurality of protruded blocks 219g disposed on a bottom of the lower disk 218g, a plurality of reeds 215g disposed on the bottom of the lower disk 218g, a ring 2182g disposed on the lower disk 218g, and a notch 2181g formed on the ring 2181g. The upper disk 216g has a center recess hole 212g formed on the upper disk 216g, a magnet 213g disposed in the upper disk 216g, a round plate 2161g disposed on a bottom of the upper disk 216g, two posts 2162g disposed on a bottom of the round plate 2161g, and a spacing 2163g defined between two posts 2162g. A spiral spring 217g is disposed in the ring 2182g. The spiral spring 217g has a first end 2171g and a second end 2172g. The hollow casing 231g has a through hole 235g and a round hole 2311g. A plug 233g is disposed on the hollow casing 231g. A lead wire 222g surrounds the annular bosses 221g. An end of the connection wire 242g is connected to one of the reeds 215g. The connection wire 242g winds the annular groove 211g. The press rod 2321g passes through the round hole 2311g. The first end 2171g of the spiral spring 217g is inserted in the spacing 2163g. The earphone/microphone union device 24g has an earphone 241g and a microphone 243g.

The features of the present invention are the reel disk, the wire receiving disk and a base seat to receive the reel disk and the wire receiving disk. The reel disk can be a unique disk or can contain a lower disk and an upper disk. A center recess hole is formed on the reel disk to receive an earphone/microphone union device.

The invention is not limited to the above embodiment but various modification thereof may be made. Further, various changes in form and detail may be made without departing from the scope of the invention.

I claim:

1. An earphone/micro phone assembly comprises:
 a main body,
 an earphone/microphone union device,
 a connection wire connected to the main body and the earphone/microphone union device,
 the main body having a base seat,
 the base seat having a lead hole, a wire receiving disk disposed in the base seat, a plurality of annular bosses formed on the wire receiving disk, a reel disk disposed in the base seat to cover the wire receiving disk, a plurality of reeds disposed on a bottom of the reel disk, a center recess hole formed on the reel disk, a magnet disposed in the reel disk, an annular groove formed on the reel disk, a hollow casing covering the base seat, the hollow casing having a through hole, a lead wire surrounding the annular bosses, an end of the connection wire connected to one of the reeds, and the connection wire winding the annular groove.

2. An earphone/microphone assembly as claimed in claim 1, wherein a base plate is disposed on the bottom of the main body, the base plate has a flat plate, two arm plates are disposed on the flat plate, a plurality of clamp hooks are disposed on the flat plate, and the clamp hooks are inserted in the corresponding insertion holes respectively.

3. An earphone/microphone assembly as claimed in claim 1, wherein a spiral spring is disposed in the reel disk and the spiral spring has a first end and a second end.

4. An earphone/microphone assembly as claimed in claim 3, wherein the reel disk has a lower disk and an upper disk disposed on the lower disk.

5. An earphone/microphone assembly as claimed in claim 4, wherein the lower disk has a plurality of protruded blocks disposed on a bottom of the lower disk, said plurality of reeds disposed on the bottom of the lower disk, a ring disposed on the lower disk, and a notch formed on the ring.

6. An earphone/microphone assembly as claimed in claim 4, wherein said center recess hole formed on the upper disk, said magnet disposed in the upper disk, a round plate disposed on a bottom of the upper disk, two posts disposed on a bottom of the round plate, and a spacing defined between the posts.

7. An earphone/microphone assembly as claimed in claim 1, wherein a round hole is formed on the hollow casing.

8. An earphone/microphone assembly as claimed in claim 7, wherein a press rod is disposed on the base seat and the press rod passes through the round hole.

9. An earphone/microphone assembly as claimed in claim 1, wherein a plug is disposed on the hollow casing.

10. An earphone/microphone assembly as claimed in claim 1, wherein a flexible pipe is disposed on the hollow casing and a plug is connected to the flexible pipe.

* * * * *